United States Patent Office 2,970,995
Patented Feb. 7, 1961

2,970,995
REDUCTIVE ACYLATED PRODUCTS OF RIBOFLAVIN

Donald H. Wheeler, Minneapolis, Minn., assignor to General Mills, Inc., a corporation of New Jersey No Drawing. Filed Mar. 20, 1959, Ser. No. 800,620

1 Claim. (Cl. 260—211.3)

This invention relates to the reductive acylated products of riboflavin having a color lighter than riboflavin but which in ordinary use will readily yield riboflavin.

In many instances the inclusion of riboflavin as a fortification agent in some products results in the product having an undesirable yellow color. Some method of reducing the color of riboflavin has been sought. One solution to the problem is to form derivatives of riboflavin which will have a color lighter than that of the original riboflavin which has an orange-yellow color. However, in the formation of such virtually colorless derivatives the biological activity is influenced so that although the color is lighter the biological activity of riboflavin is not present.

It has now been found that certain reductive acylated products of riboflavin have a much lighter color than the original riboflavin and in ordinary use will yield riboflavin so that the biological activity is retained.

It is therefore an object of this invention to provide a virtually colorless derivative of riboflavin.

It is also an object of this invention to provide a reductive acylated product of riboflavin.

It is a further object of this invention to provide such a product which will readily convert to riboflavin in ordinary use.

Briefly the method consists in reducing the riboflavin to the leuco compound and then acylating the leuco form to stabilize it as a colorless acylated leuco compound. Structurally then, the only actions necessary to regenerate the original riboflavin are hydrolysis and oxidation and both processes occur in the digestive tract. Chemically the transformation can be represented as follows:

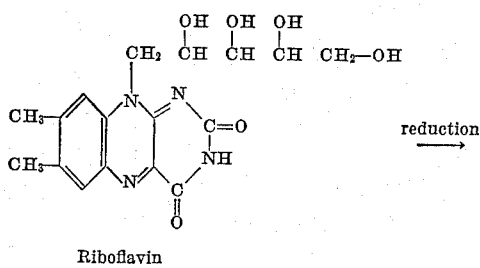

Riboflavin

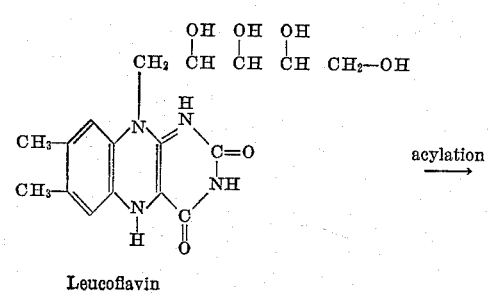

Leucoflavin

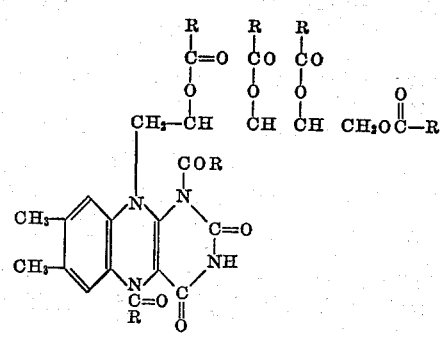

Hexa-acylated leucoflavin

Although the above illustrated reaction indicates that the reduction and acylation steps are performed as independent steps, it is understood that simultaneous reduction and acylation can take place.

In general the reductive acylation of riboflavin consists in heating the riboflavin in the presence of a suitable acylating agent and reducing agent.

In addition to the riboflavin other suitable starting materials would be partially acylated riboflavin, for example riboflavin tetra-acetate.

Any suitable acylating agent can be used such as the acyl chlorides or bromides and acid anhydrides. Illustrative of such acylating agents would be acetic anhydride and acetyl chloride.

The reducing agent employed in this invention is zinc dust and acetic acid which liberates hydrogen, thus providing the reducing action. The invention can further be illustrated by means of the following examples.

EXAMPLE I

*Reductive acetylation of riboflavin*

3.0 grams of riboflavin, 10.0 cc. of acetic acid and 60.0 cc. of acetic anhydride were placed in an Erlenmeyer flask and heated to boiling. To the boiling suspension zinc dust was added in small proportions from time to time. After all the riboflavin had dissolved the solution had a pale yellow color. The zinc dust was removed by filtration and washed with a small portion of hot acetic anhydride which washings were added to the pale yellow filtrate. The yellow filtrate was evaporated to dryness in vacuo and the yellow residue consisting of leuco flavin hexa-acetate was dissolved in chloroform. Hexane was added until a yellow solid separated. The product was centrifuged and dried in a vacuum desiccator. The material was a pale yellow amorphous powder that was very soluble in alcohol, acetone, benzene and chloroform; only slightly soluble in water, and was insoluble in ether and petroleum ether.

A small portion of the preparation was added to approximately 0.1 N HCl and the suspension was boiled until complete solution had resulted. The solution had a wine-red color which is the color of a solution that has been reduced with zinc and dilute HCl. The acid was neutralized by the addition of sodium bicarbonate, thus causing the precipitation of a bright yellow powder that had all the appearances of riboflavin.

EXAMPLE II

*Preparation of riboflavin tetra-acetate*

5.0 grams of riboflavin, 20.0 cc. of acetic anhydride and 100.0 cc. of pyridine were heated together in an Erlenmeyer flask for a short time until all the riboflavin had dissolved. The solvent was then removed by heating under vacuum. The residue was dissolved in a small amount of pyridine, filtered and to the hot filtrate 200 cc. of water was added. After chilling small yellow needle crystals formed which were removed by filtration. The crystals were dried in a vacuum desiccator over sulfuric acid. The yield was 5.78 grams (80% yield) of riboflavin tetra-acetate which had an uncorrected melting point of 237–238°. The melting point of riboflavin tetra-acetate is normally given as 238–239°. The crystals were very soluble in chloroform, pyridine, and acetone; almost insoluble in dioxane, ether, benzene and petroleum ether; and soluble in boiling alcohol, xylene and ethyl acetate.

EXAMPLE III

*Reductive acetylation of riboflavin tetra-acetate*

3.0 grams of riboflavin tetra-acetate were dissolved in 10.0 cc. of acetic acid and the solution was heated to boiling. 4.0 grams of zinc powder were added slowly in small portions causing the original dark orange solution to change color becoming a very dark green. 15.0 cc. of acetic anhydride were then added. After boiling for a short time the solution became almost colorless. The zinc was removed by filtration and washed with small portions of boiling chloroform. The combined filtrates were evaporated almost to dryness in vacuo and the residue was dissolved in chloroform. The chloroform solution was extracted with water and then run into 500 cc. of petroleum ether. A precipitate formed which was centrifuged from solution and dried to yield a pale yellow light amorphous powder.

Having thus described my invention, I therefore claim:
Leucoflavin hexa-acetate.

No references cited.